Feb. 7, 1939.   L. G. M. TIMPSON   2,146,605
METHOD AND APPARATUS FOR PRODUCING FIRE EXTINGUISHING FOAM
Filed Aug. 30, 1934   2 Sheets-Sheet 1
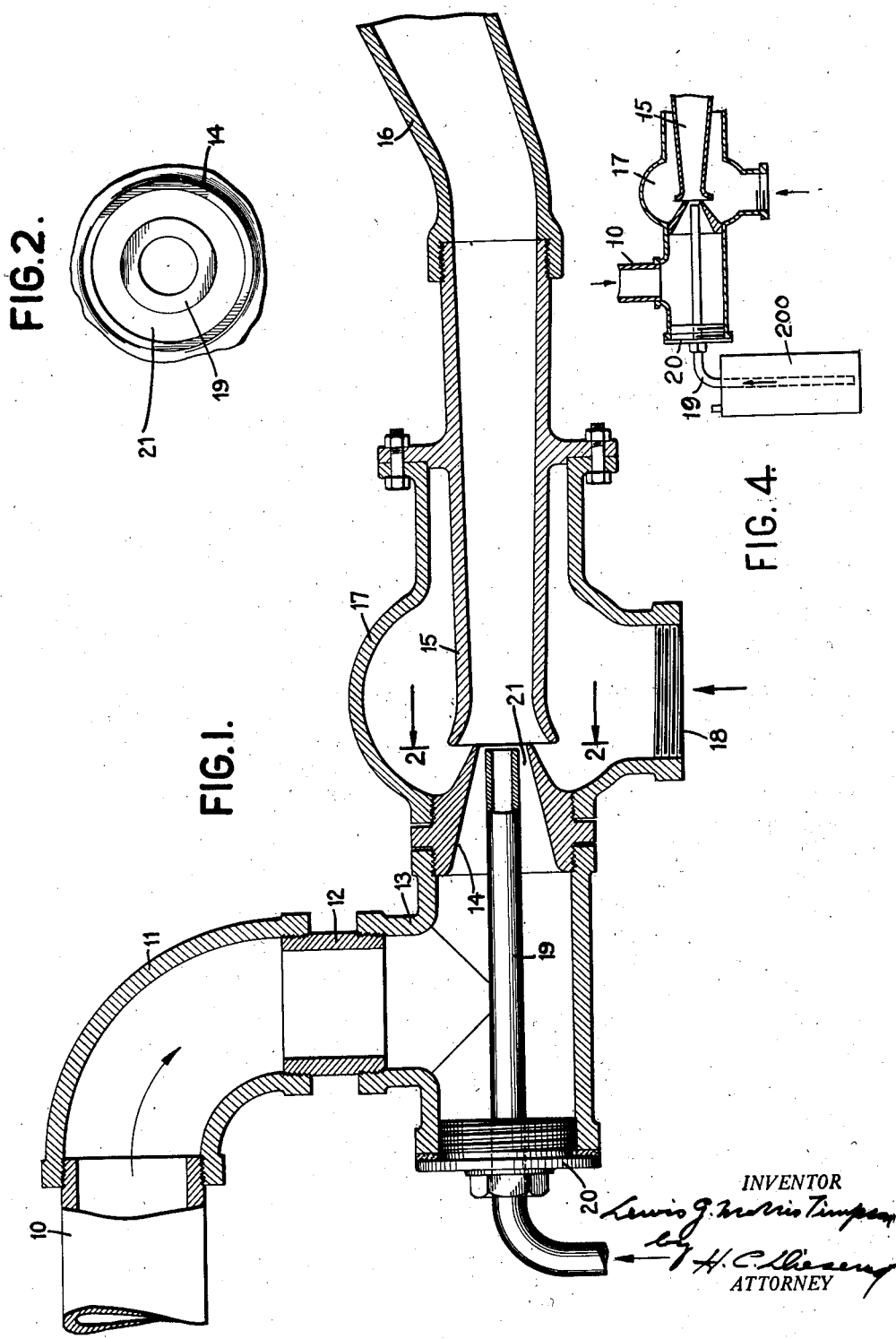
INVENTOR
Lewis G. Morris Timpson
by H. C. Gieseng
ATTORNEY Patented Feb. 7, 1939

2,146,605

UNITED STATES PATENT OFFICE 2,146,605

METHOD AND APPARATUS FOR PRODUCING FIRE EXTINGUISHING FOAM

Lewis G. Morris Timpson, Plainfield, N. J., assignor to Pyrene-Minimax Corporation, a corporation of Delaware Application August 30, 1934, Serial No. 742,042

12 Claims. (Cl. 169—15)

This invention relates to foam-forming methods and apparatus, and particularly to methods and apparatus for generating a stream of foam consisting of relatively stable bubbles, for blanketing fires such as are capable of this treatment, and extinguishing them primarily by excluding oxygen from the seat of the blaze. The present invention may be used to produce a simple air foam, in which air alone is the bubble-forming gas, or in conjunction with a device for generating a chemical foam. In the latter case, a foam is formed in which the gaseous medium, usually carbon dioxide, is produced by chemical reaction, and the present invention acts to supplement this chemical foam by the addition of air to the foam formed as hereinafter set forth.

It has been proposed heretofore to produce a fire extinguishing foam having ordinary air enclosed in the bubbles in lieu of an inert gas, such as carbon dioxide, generated by chemical reaction in the course of forming the bubbles. Prior attempts along this line, however, have not proved altogether successful due to the difficulty of obtaining sufficient air within the bubbles to produce a satisfactory, stable, fire blanketing foam. For example, when an attempt is made to incorporate air in a flowing stream of water by the movement of the water itself there is a limit to the amount of air that will be combined. The action is one of entrainment, the air being drawn or forced into a multiplicity of small pockets or indentations formed in the outer surface of an advancing stream. A determining factor in the ratio of water to air in the resulting mixture, therefore, is the ratio of surface area per unit length of such stream. An ordinary stream of suitable size to be effective for fire extinguishing purposes, say ½ inch in diameter, will entrain only about half enough air to form an effective, durable fire-blanketing foam.

An important object of the present invention is to provide a method and means of insuring the incorporation of a sufficient amount of air in a flowing stream of water to produce a stable, tough foam having good body, either with or without a gas generated by chemical reaction. This, in addition to insuring a good quality of foam, provides for maximum volume with the expenditure of any given quantity of water. More specifically, an object has been the provision of means whereby a stream of water may be made to provide a large unit surface area for entraining air or other gas to form bubbles, and for receiving and absorbing a supply of saponin or other foam-stabilizing agent. Other objects and advantages will appear from a description of the invention, in conjunction with the accompanying drawings, in which:

Fig. 1 is a vertical section through an apparatus for generating air foam according to the present invention;

Fig. 2 is an enlarged fragmentary transverse section on line 2—2 of Fig. 1;

Figure 4 is a schematic view of a fire extinguishing system embodying the form of the invention shown in Figure 1.

Figure 3:
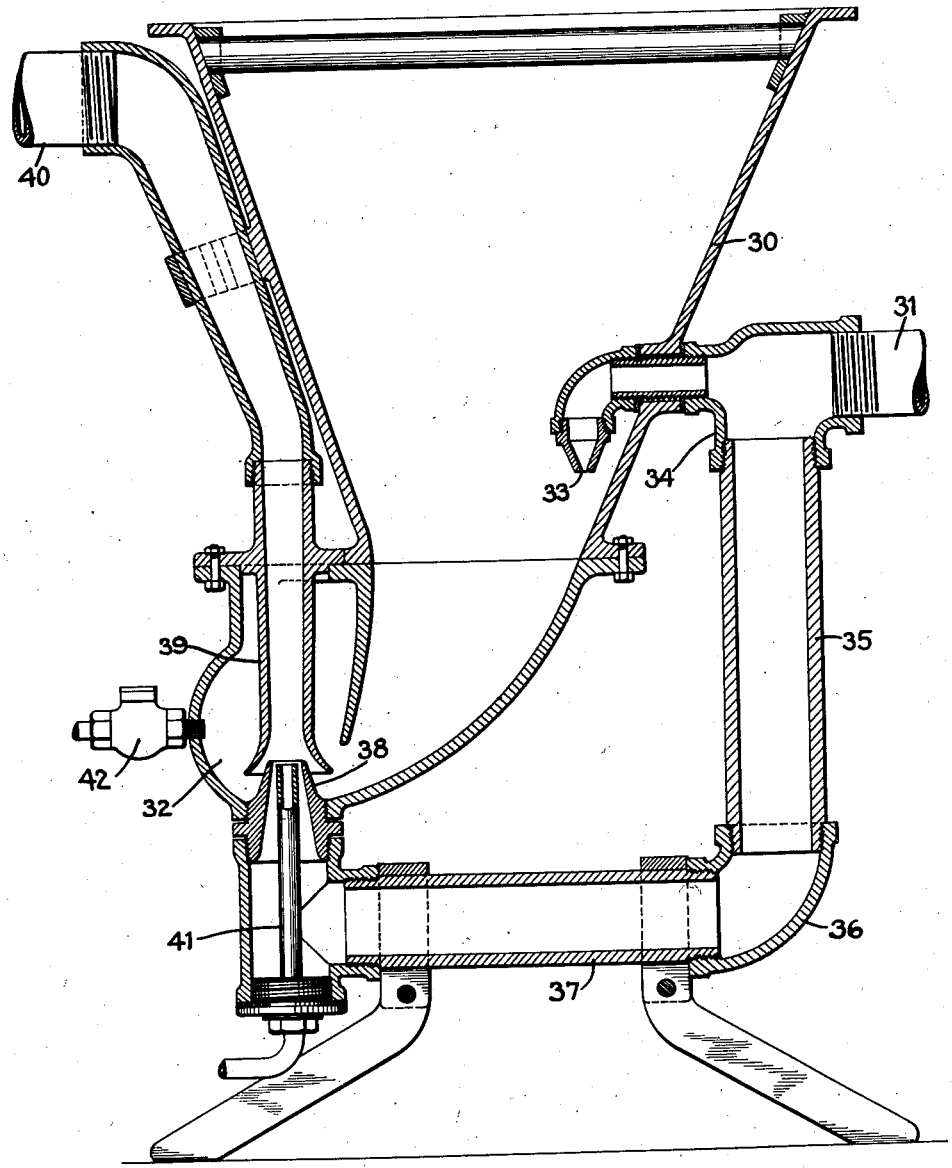
Fig. 3 is a vertical section through an apparatus for forming a mixed chemical and air foam according to the present invention.

Referring to Fig. 1, the numeral 10 designates a water supply conduit through which water under suitable pressure is supplied to the apparatus. As will be apparent, the course of the water will be through elbow 11, nipple member 12, T-joint 13 and an ejector consisting of a converging orifice nozzle 14 and receiver 15, then through a diverging member 16 into a suitable discharge conduit, not shown. A casing 17, freely open to the atmosphere as at 18, surrounds the ejector and maintains the nozzle 14 and receiver 15 in suitable fixed relation.

A conduit 19 is arranged centrally of the T-joint 13 and extends into the nozzle 14 approximately to the plane of the mouth thereof. Means are preferably provided for adjusting the conduit 19 with respect to the mouth of the nozzle 14, so as to secure the optimum conditions of water discharge therethrough, for the purposes hereinafter set forth. Conduit 19 extends rearwardly through a gland 20, and is connected to a source of supply 200 of saponin or other foam-stabilizing agent. This agent may be supplied either as a liquid suspension or as a freely flowing dry powder by the suction action of the stream or by any other convenient method.

It will be readily seen that the jet of water issuing from the nozzle 14 will be annular in form, because of the concentric arrangement of the nozzle and the conduit 19. The form of and suitable proportions for the water jet are illustrated on an enlarged scale in Fig. 2, wherein the numeral 21 designates the orifice defined by the nozzle 14 and conduit 19. However, the proportions illustrated are not critical, and they may be varied as desired, to meet varying conditions as they arise in practice. The principles governing the form and arrangement of the parts is that the passage formed between the nozzle and conduit should be such as not to unduly retard the flow of water and at the same time to provide the stream with a relatively large outer surface area in proportion to the volume of flow. It will be appreciated that if the passage tends to form a stream having a very thin wall the frictional resistance will be so great as to produce an inefficient device, i. e., an excessive portion of the pressure of the stream will be wasted in maintaining a flow through the jet.

The incorporating of air into a stream of water is, as stated before, accomplished by an entraining action, the rate of which is necessarily a function of the units surface area of the stream. It is apparent, therefore, that a much larger amount of air will be entrained in an annular stream than in a solid stream. For example, employing the proportions illustrated in the drawings, although as pointed out above these proportions are not critical, let it be assumed that a satisfactory volume of water will be supplied by a solid stream 14 mm. in diameter. The flow area of such a stream is 153.9 sq. mm., and the unit surface will be pi times the diameter or approximately 44 sq. mm. per linear mm. An annular stream having an inside diameter of 10 mm. and an outside diameter of approximately 17.4 mm. will have an equal flow area and will therefore supply an equal volume of water, at a given rate of flow. The unit surface area of the annular stream, however, will be the sum of the inside and outside unit areas, 31.42 sq. mm. and 54.66 sq. mm. respectively, or approximately 86.1 sq. mm. per linear mm. As will be noted, this is nearly double the unit surface area of the equivalent solid stream.

In the form of apparatus shown in Fig. 1, the outer surface only of the water is exposed to the air, but this outer surface is, as demonstrated, of considerably greater surface area than that of an equivalent solid stream, and hence is capable of entraining a greater quantity of air. The saponin, being supplied through conduit 19 to the inner surface of the water stream, is easily and efficiently taken up by the stream and mixed therethrough, resulting in the formation of a considerably larger volume of stable foam than would be possible with the use of a solid stream of water of equivalent volume. If an even greater quantity of air in proportion to water is desired this may be brought about by increasing the inside and outside diameters of the annular stream. For example, the outside diameter might be increased to 20 mm. while the inside diameter would then be made approximately 14.3 mm. to provide the same volume of flow. The outer surface area would in this case be 62.83 sq. mm. per linear mm., or nearly 50% more than for a solid stream. If desired the entire inner and outer surfaces of the stream might be utilized or air entrainment. In this case the conduit 11 would be simply placed in open communication with the atmosphere while the foam stabilizer would be added to the water at some other point, for example, at, or in advance of, the elbow 11.

The apparatus of Fig. 3 employs a chemical foam generator of the type disclosed in U. S. Patent No. 1,907,901, issued May 9, 1933. As shown it comprises a hopper 30 into which foam forming chemicals can be introduced from time to time, the operation of the apparatus being such that the chemicals are added to a stream of water received from a conduit 31. At one side of the bottom of the hopper 30 is provided a mixing well 32, into which the chemicals are washed by water flowing into the hopper through a small nozzle 33 connected to the conduit 31. The larger part of the water supplied through conduit 31 flows through connections 34, 35 and 36 to a nozzle 38, thence into a receiver 39 and out into a discharge conduit 40.

As the jet of water passes through the ejector formed by the nozzle 38 and receiver 39, it picks up the slurry of foam forming chemicals which is continuously formed in the mixing well 32, and foam is accordingly formed and discharged through conduit 40. The jet is made annular, just as in the case of the device of Fig. 1, by introducing a concentric core consisting of a conduit 41. This conduit provides convenient means for supplying air to the inner surface of the jet, and thus increasing the amount of foam that may be produced from a given quantity of chemicals. In utilizing this form of the invention, it is preferable to use, in the mixture supplied to the hopper, a slightly larger proportion of stabilizing agent than would be necessary with a solid jet of water, in order to stabilize the bubbles produced by the air introduced through the conduit 41 in addition to the regular chemical foam.

The conduit 41 may be simply open to the atmosphere, or it may be connected to a supply of air under pressure. If desired, a gas other than air may be used, for example, carbon dioxide. In either case it is apparent that the quantity of foam produced will be enhanced by the volume of air or gas introduced through the conduit 41.

The pressure within the mixing well 32 will normally vary during operation, sometimes being above normal atmospheric pressure. In order to prevent the formation of a partial vacuum, a check valve 42 may be provided, which will admit air from the exterior but will prevent the escape of foam or sludge.

While the apparatus illustrated is adapted to form an annular stream of water, it is apparent that any hollow stream or stream having a greater surface area in relation to flow area than a solid circular stream will, to a greater or lesser extent, possess the same advantages, and may be used in lieu of an annular stream. For example, the sheet of water need not necessarily form a completely enclosed tube.

The terms and expressions employed herein are used for purposes of description and not of limitation. It is recognized that many modifications of the construction disclosed may be made within the scope of the present invention.

What I claim is:

1. In apparatus of the class described a hopper for foam-forming and stabilizing chemicals, said hopper having a discharge opening adjacent its lower end, an ejector arranged to receive said chemicals from the hopper, means for creating a jet of water at said ejector to receive and carry away said chemicals, and means for introducing a gas into the interior of said jet.

2. In apparatus of the class described a hopper for foam-forming and stabilizing chemicals, said hopper having a discharge opening adjacent its lower end, an ejector arranged to receive said chemicals from the hopper, means for creating a jet of water at said ejector to receive and carry away said chemicals, means for directing a stream of water into said hopper to wash the chemicals into the path of said jet, and means for introducing a gas into the interior of said jet.

3. A method of producing fire extinguishing foam which comprises forming a hollow, tubular stream of water, entraining air in the outer surface of said stream, and introducing a foam stabilizing agent into said stream substantially entirely by the aspirating action of the inner surface thereof.

4. A method of producing fire extinguishing foam which comprises forming a hollow, tubular jet of water, introducing foam forming and stabilizing chemicals into said jet by the aspirating action thereof at one surface, and introducing air into said jet by the aspirating action thereof at the other surface.

5. In a foam-forming apparatus, an ejector comprising a flared tube, means for passing a tubular jet of water into said ejector tube, means for introducing a gas to the inner surface of said jet for aspiration thereby, a source of supply of a foam-stabilizing agent, and means for introducing said foam-stabilizing agent to the outer surface of said jet adjacent the inlet of said tube.

6. In a foam-forming apparatus, an ejector comprising a flared tube, means for passing a tubular jet of water into said ejector tube, a source of supply of foam-forming chemicals, means for introducing said foam-forming chemicals to said jet of water adjacent the inlet of said tube, and means for introducing a gas to an inner surface of said jet of water.

7. A method of producing fire extinguishing foam which comprises flowing water under pressure to produce a jet in the form of a relatively thin sheet, introducing a gas into said jet by the aspirating action of one surface thereof, and introducing a foam stabilizing agent into said jet substantially entirely by the aspirating action of another and independent surface thereof.

8. In foam-forming apparatus an ejector comprising a receiver having a mouth, a nozzle arranged to direct a jet of liquid into said receiver, a conduit having an unobstructed opening adapted to discharge a solid stream of liquid extending into said nozzle concentric therewith a sufficient distance to cooperate with said nozzle to make said jet tubular in shape, means for supplying water under pressure to said nozzle exterior of said conduit, means for supplying a foam stabilizing agent to said conduit, and means for supplying a gas to the mouth of said receiver.

9. In foam-forming apparatus an ejector comprising a receiver having a mouth, a nozzle, a conduit having an unobstructed opening adapted to discharge a solid stream of liquid extending into said nozzle, said conduit and nozzle being arranged to discharge a substantially annular jet of liquid into the mouth of said receiver, means for supplying water containing foam stabilizing material under pressure to said nozzle exterior of said conduit, means for supplying air under substantially atmospheric pressure to said conduit and to the mouth of said receiver.

10. A method of producing fire extinguishing foam comprising flowing water under pressure containing foam stabilizing material to produce a jet in the form of a relatively thin sheet having separate and independent aspirating surfaces, projecting said jet into a receiver, and supplying air under substantially atmospheric pressure to said surfaces to be aspirated thereby.

11. A method of producing fire extinguishing foam comprising flowing water under pressure containing foam stabilizing material to produce a jet of tubular shape having an iner and outer aspirating surface, projecting said jet into a receiver, and incorporating air into said stream by the aspirating action of both said inner and outer surfaces.

12. A method of producing fire extinguishing foam which comprises forming a hollow, tubular stream of water having inner and outer aspirating surfaces, introducing air under substantially atmospheric pressure to one of said surfaces, and introducing foam stabilizing agent into said stream substantially entirely by the aspiration action of the other of said surfaces.

LEWIS G. MORRIS TIMPSON.